United States Patent [19]

Kukes et al.

[11] Patent Number: 4,551,230

[45] Date of Patent: Nov. 5, 1985

[54] DEMETALLIZATION OF HYDROCARBON FEED STREAMS WITH NICKEL ARSENIDE

[75] Inventors: Simon G. Kukes; Gerhard P. Nowack, both of Bartlesville, Okla.

[73] Assignee: Phillips Petroleum Company, Bartlesville, Okla.

[21] Appl. No.: 655,798

[22] Filed: Oct. 1, 1984

[51] Int. Cl.⁴ .................... C10G 45/00; C10G 45/04; C10G 45/08

[52] U.S. Cl. .................................. 208/89; 208/251 H

[58] Field of Search ...................... 208/251 H, 89, 211

[56] References Cited

U.S. PATENT DOCUMENTS

| | | | |
|---|---|---|---|
| 2,954,339 | 9/1960 | Beavon | 208/254 H |
| 3,328,290 | 6/1967 | Hengstebeck | 208/89 |
| 3,676,332 | 7/1972 | Johnson et al. | 208/254 H |
| 3,697,448 | 10/1972 | Johnson et al. | 252/464 |
| 3,900,526 | 8/1975 | Johnson et al. | 208/143 |
| 4,003,828 | 1/1877 | Eberly, Jr. | 208/217 |
| 4,082,815 | 4/1978 | Johnson et al. | 260/683.2 |
| 4,172,818 | 10/1979 | Nelson et al. | 208/216 R |
| 4,441,992 | 4/1984 | Kimble | 208/251 H |

*Primary Examiner*—D. E. Gantz
*Assistant Examiner*—Helane Myers
*Attorney, Agent, or Firm*—French and Doescher

[57] ABSTRACT

Metals contained in a hydrocarbon containing feed stream are at least partially removed by contacting the hydrocarbon containing feed stream under suitable demetallization conditions with hydrogen and a catalyst composition comprising an alumina-containing support and nickel arsenide, $NiAs_x$. The life and activity of the catalyst composition can be increased by introducing a decomposable compound of a metal selected from the group consisting of the metals of Group IV-B, Group V-B, Group VI-B, Group VII-B and Group VIII of the Periodic Table into the hydrocarbon containing feed stream during or prior to contacting the feed stream with hydrogen and the catalyst composition. The preferred nickel arsenide catalyst composition is prepared by reduction of alumina-supported nickel arsenate with hydrogen gas.

26 Claims, No Drawings

DEMETALLIZATION OF HYDROCARBON FEED STREAMS WITH NICKEL ARSENIDE

BACKGROUND OF THE INVENTION

This invention relates to a process for removing metals from a hydrocarbon containing feed stream and a catalyst therefor.

It is well known that crude oil as well as products from extraction and/or liquefaction of coal and lignite, products from tar sands, products from shale oil and similar products may contain metals such as vanadium, nickel, and iron. When these hydrocarbon containing feeds are fractionated, the metals tend to concentrate in the heavier fractions such as the topped crude and residuum. The presence of the metals makes further processing of these heavier fractions difficult since the metals generally act as poisons for catalysts employed in processes such as catalytic cracking, hydrogenation or hydrodesulfurization.

SUMMARY OF THE INVENTION

It is thus an object of this invention to provide a process for removing metals from a hydrocarbon containing feed stream so as to improve the processability of such hydrocarbon containing feed stream. It is a further object of this invention to remove metals from and thus improve the processability of heavier fractions such as topped crude and residuum. It is also an object of this invention to provide a catalyst composition which is useful for demetallization.

In accordance with the present invention, a hydrocarbon containing feed stream, which also contains metals, is contacted with a solid catalyst composition comprising (a) nickel arsenide, $NiAs_x$, and (b) alumina, in the presence of hydrogen under suitable demetallization conditions. It is believed that the metals contained in heterocyclic compounds such as porphyrins are removed from said heterocyclic compounds by the combination of heat, hydrogen and the catalyst composition of the present invention and are trapped in pores in the catalyst composition. Removal of the metals from the hydrocarbon containing feed stream in this manner provides for improved processability of the hydrocarbon containing feed stream in processes such as catalytic cracking, hydrogenation and hydrodesulfurization.

Other objects and advantages of the invention will be apparent from the foregoing brief description of the invention and the appended claims as well as the detailed description of the invention which follows.

DETAILED DESCRIPTION OF THE INVENTION

Any metal which can be bound and/or trapped in the pores of the solid catalyst composition of the present invention can at least partially be removed from a hydrocarbon containing feed stream in accordance with the present invention so as to produce a hydrocarbon containing stream having a reduced metal content. The present invention is particularly applicable to the removal of vanadium and nickel.

Metals, particularly nickel and vanadium, can be removed from any suitable hydrocarbon containing feed streams. Suitable hydrocarbon containing feed streams include crude oil, petroleum products, coal pyrolyzates, products from extraction and/or liquefaction of coal and lignite, products from tar sands, products from shale oil and similar products. Suitable hydrocarbon feed streams include gas oil having a boiling range from about 205° C. to about 538° C., topped crude having a boiling range in excess of about 343° C., and residuum. However, the present invention is particularly directed to heavy feed streams such as heavy topped crudes and residuum and other materials which are generally regarded as being too heavy to be distilled. These materials will generally contain the highest concentrations of metals, such as about 10–1000 ppm of vanadium and about 5–500 ppm of nickel. They generally also contain sulfur impurities and frequently also nitrogen impurities and coke precursors (measured as Ramsbottom or Conradson carbon residue), which may at least partially be removed by the process of this invention.

The demetallization catalyst employed in the process of this invention comprises (a) a nickel arsenide having the empirical formula $NiAs_x$, wherein x can have a value ranging from about 0.33 to about 2.0 (thus including compounds such as $Ni_3As$, $NiAs$, $Ni_3As_2$ and $NiAs_2$), preferably ranging from about 0.6 to about 1.0; and (b) an alumina-containing support such as alumina, alumina-silica, alumina-zeolite, alumina-titania, alumina-zirconia, alumina-magnesia, alumina-$BPO_4$, alumina-$AlPO_4$ and the like and mixtures thereof, preferably alumina having a surface area of about 10 to about 400 $m^2/g$ (as determined by the $BET/N_2$ method). It is within the scope of this invention to employ alumina-containing supports comprising small amounts (e.g., up to 1 weight-%) of oxides of metals belonging to Groups VB, VIB, VIIB, VIII and IB of the Periodic Table (as described in College Chemistry, by W. H. Nebergall et al.; D. C. Heath and Company; 1972).

The preferred catalyst employed in the process of this invention is disclosed in U.S. Pat. No. 3,697,448 herein incorporated by reference. In the preferred method of preparation, the alumina-supported nickel arsenide is formed by reduction of alumina-supported nickel arsenate or arsenite, more preferably nickel(II) arsenate, with a reducing agent such as $H_2$ or CO, preferably with $H_2$ gas at an elevated temperature.

In the preparation of the catalyst to be employed in this invention, the nickel and arsenic components can be simultaneously deposited on the support as, for example, by precipitating nickel arsenate on the support; or, the support can be impregnated with the nickel and the arsenic in individual, sequential treatments. In either instance, sufficient nickel is employed so as to produce a finished catalyst composition containing from about 1 to about 30, preferably from about 10 to about 20, weight percent nickel, and sufficient arsenic is employed so as to produce a finished catalyst composition containing from about 0.05 to about 50, preferably 10 to 20, weight percent arsenic. Preferably, the alumina-supported nickel arsenate composition (after calcination) has a $BET/N_2$ surface area of about 20 to 300 $m^2/g$ and a pore volume (by water absorption) of about 0.5 to 1.5 cc/g.

The alumina-containing catalyst base can be conventionally impregnated with solutions of inorganic compounds of As including acids and ammonium salts of arsenic, and inorganic compounds of Ni including nitrates, halides, sulfates, acetates and so forth of nickel. For example, arsenic pentoxide dissolved in water or an ammoniacal solution of $As_2O_5$ can be employed as one impregnant, and an aqueous solution of Ni(NO$_3$)$_2$ can be employed as the second impregnant.

In any method of preparation, the alumina-containing base, after deposition of nickel arsenate thereon, can be washed to remove undesirable soluble salts, dried and, preferably, calcined in air (e.g., at about 800°–1100° F.), and then reduced with hydrogen at any suitable temperature and pressure which are sufficient to produce the active nickel arsenide. For example, reduction with hydrogen gas at atmospheric pressure at about 500°–800° F. for about 0.1–20 hours can be used.

Even though the impregnation of the alumina-containing support with nickel arsenate and subsequent reduction with hydrogen gas is the preferred mode of preparation, it is within the scope of this invention to employ other preparation techniques such as impregnation of the support with a nickel salt and exposure of the impregnated support to arsine gas or alkyl arsines or aryl arsines, or by impregnation of the support with metallic nickel and subsequent heating of the impregnated support in the presence of elemental arsenic or arsines, or by other methods known to those skilled in the art.

The demetallization process of this invention can be carried out by means of any apparatus whereby there is achieved a contact of the catalyst composition with the hydrocarbon containing feed stream and hydrogen under suitable demetallization conditions. The process is in no way limited to the use of a particular apparatus. The process of this invention can be carried out using a fixed catalyst bed, fluidized catalyst bed, a moving catalyst bed or an agitated slurry type operation (e.g. in hydrovisbreaking). Presently preferred is a fixed catalyst bed.

The catalyst composition can be used alone in the reactor or can be used in combination with essentially inert materials such as alumina, silica, titania, magnesia, silica-alumina, metal titanates and metal phosphates. A layer of the inert material and a layer of the catalyst composition can be used, or the catalyst composition can be mixed with the inert material. Use of the inert material provides for better dispersion of the hydrocarbon containing feed stream. Also, other catalysts such as known hydrogenation and desulfurization catalysts may be used in the reactor to achieve simultaneous demetallization, desulfurization, denitrogenation and hydrogenation or hydrocracking if desired.

Any suitable reaction time between the catalyst composition and the hydrocarbon containing feed stream can be utilized. In general, the reaction time will range from about 0.05 hours to about 10 hours. Preferably, the reaction time will range from about 0.4 to about 4 hours. Thus, the flow rate of the hydrocarbon containing feed stream should be such that the time required for the passage of the mixture through the reactor (residence time) will preferably be in the range of about 0.4 to about 4 hours. This generally requires a liquid hourly space velocity (LHSV) in the range of about 0.10 to about 20 cc of oil per cc of catalyst per hour, preferably from about 0.25 to about 2.5 cc/cc/hr.

The demetallization process of the present invention can be carried out at any suitable temperature. The temperature will generally be in the range of about 250° C. to about 550° C. and will preferably be in the range of about 350° C. to about 450° C. Higher temperatures do improve the removal of metals, but temperatures which will have adverse effects on the hydrocarbon containing feed stream, such as excessive coking, will usually be avoided. Also, economic considerations will usually be taken into account in selecting the operating temperature. Lower temperatures can generally be used for lighter feeds.

Any suitable pressure may be utilized in the demetallization process. The reaction pressure will generally be in the range of up to about 5,000 psig, e.g., ranging from about atmospheric pressure to about 5,000 psig. Preferably, the pressure will be in the range of about 100 to about 2500 psig. Higher pressures tend to reduce coke formation but operation at high pressure may have adverse economic consequences.

Any suitable quantity of hydrogen can be added to the demetallization process. The quantity of hydrogen used to contact the hydrocarbon containing feed stock will generally be in the range of about 100 to about 10,000 standard cubic feet per barrel of the hydrocarbon containing feed stream and will more preferably be in the range of about 1000 to about 6000 standard cubic feet per barrel of the hydrocarbon containing feed stream.

In general, the catalyst composition is utilized for demetallization until a satisfactory level of metals removal is no longer achieved which is believed to result from the coating of the catalyst composition with the metals being removed. It is possible to remove the metals from the catalyst composition by certain leaching procedures. But these procedures are expensive, and it is generally contemplated that once the removal of metals falls below a desired level, the used catalyst will simply be replaced by a fresh catalyst.

The time in which the catalyst composition will maintain its activity for removal of metals will depend upon the metals concentration in the hydrocarbon containing feed streams being treated. It is believed that the catalyst composition can be used for a period of time long enough to accumulate 20–200 wt. % of metals, mostly Ni and V, based on the initial weight of the catalyst composition, from oils.

A further embodiment of this invention is a demetallization process comprising the step of introducing at least one decomposable metal compound into the hydrocarbon containing feed stream prior to its being contacted with the alumina-supported NiAs$_x$ catalyst in accordance with this invention. The metal, chemically bound in the decomposable metal compound, is selected from the group consisting of the metals of Group IV-B, Group V-B, Group VI-B, Group VII-B and Group VIII of the Periodic Table (as described in College Chemistry, W. H. Nebergall et al.; D. C. Heath and Company, 1972). Preferred metals are molybdenum, tungsten, manganese, chromium, and zirconium. Molybdenum is a particularly preferred metal which can be introduced as a carbonyl, acetate, acetylacetonate, octoate, naphthenate, dithiophosphate or dithiocarbamate. Molybdenum hexacarbonyl is a particularly preferred additive. It is believed that the life of the catalyst composition and the efficiency of the demetallization process is improved by introducing at least one of the above-cited decomposable metal compounds into the hydrocarbon containing feed, which also contains metals such as nickel and vanadium.

Any suitable concentration of the decomposable metal compound can be added to the hydrocarbon containing feed stream. In general, a sufficient quantity of said compound will be added to the hydrocarbon containing feed stream to result in a concentration of the metal, chemically bound in said decomposable compound, in said feed stream ranging from about 1 to about 1000 parts per million (ppm) metal, and more preferably in the range of about 5 to about 100 ppm metal.

In a still further embodiment of this invention, the alumina-supported NiAs$_x$ catalyst composition is first impregnated with at least one of the above-recited decomposable metal compounds, generally dissolved in a suitable solvent such as naphtha or light gas oil. The thus impregnated alumina-supported NiAs$_x$ catalyst composition is then contacted with a metal containing hydrocarbon feed stream under demetallizing conditions in accordance with this instant invention. It is also within the scope of this embodiment to carry out said impregnating step at a temperature sufficiently high (e.g., about 200°–400° C.) so as to at least partially decompose said decomposable metal compound. The catalyst composition containing said at least partially decomposed metal compound is then contacted with a metal containing hydrocarbon feed under demetallizing conditions in accordance with the present invention.

If the demetallization process of the present invention is used in a refinery where hydrodesulfurization is practiced, the demetallization process of this invention can be employed before or after a hydrodesulfurization step. The fact that the feedstream has been passed through a hydrodesulfurization process does not affect the demetallization process of the present invention. It is, however, preferred to carry out the demetallization of this invention first, and thereafter desulfurize at least a portion of the products, preferably by a catalytic hydrotreating process, which generally removes more metals, sulfur, nitrogen and coke precursors. Generally, at least a portion of the thus hydrotreated product stream is subsequently cracked in a cracking reactor, e.g. in a fluidized catalytic cracking unit, so as to produce gasoline and other useful fuels. If, however, the sulfur content of the hydrocarbon feed is low, the desulfurization step can be omitted and the at least partially demetallized hydrocarbon stream can be fed directly to a cracking reactor and treated under cracking conditions so as to produce gasoline and other useful fuels.

The following examples are presented in further illustration of the invention and are not to be considered as unduely limiting the scope of this invention.

EXAMPLE I

In this example the preparation of two alumina-supported nickel catalysts is described. The NiAs$_x$—Al$_2$O$_3$ catalyst of this invention is prepared as follows. 200 grams (0.687 moles) of Ni(NO$_3$)$_2$·6H$_2$O were dissolved in water. Then 230 grams of Catapal N alumina marketed by CONOCO, (a unit of E. I. Du Pont de Nemours & Co., Teterboro, N.J.) were slurried with this solution, and 53 grams (0.23 moles) of As$_2$O$_5$ completely dissolved in water containing a few drops of concentrated nitric acid were added. Then an aqueous, 9-10 molar ammonia solution was slowly added to the slurry with stirring until the pH was about 7.5–8.0. After 1-2 days of standing, additional 7 grams of As$_2$O$_5$ completely dissolved in water plus enough ammonia solution to adjust the pH to about 8 were added. The slurry was filtered through a Buchner funnel. The filter cake comprising Al$_2$O$_3$ and Ni$_3$(AsO$_4$)$_2$ precipitate was washed, dried at 105° C. for about two days, and calcined at about 1000° F. overnight. The calcined material had a surface area (BET/N$_2$) of 175 m$^2$/g, a pore volume (by water absorption) of 0.8 cc/g, a Ni content of 13.3 weight-% and an As content of 12.4 weight-%. As indicated in Example II, the Ni$_3$(AsO$_4$)$_2$ was reduced in a hydrogen stream before demetallization runs to NiAs$_x$, essentially in accordance with the disclosure in Example I of U.S. Pat. No. 3,697,448. This catalyst was employed in invention runs 1,3,6,9,12,15,18,20 (see Table I).

A control catalyst, NiO on Al$_2$O$_3$, was prepared as follows. 100 grams of Catapal N alumina were slurried in about 100 cc of water. Then a solution of 87 grams of Ni(NO$_3$)$_2$·6H$_2$O in about 100 cc of water was added. The mixture was heated to boiling for about one hour, neutralized with a concentrated ammonia solution to a pH of about 8, and heated again to boiling. The hot mixture was then filtered through a Buchner funnel. The filter cake was washed, dried overnight at about 230° F. and calcined for one hour at about 1000° F. The calcined, hard material was crushed and sieved. The 10/40 mesh fraction was used for control demetallization runs 2,4,7,10,13,16 (see Table I) after heating in a hydrogen stream (see Example II). The Ni content of this NiO—Al$_2$O$_3$ catalyst (before heating in hydrogen) was about 14 weight-%; its surface area was about 175 m$^2$/g; its pore volume was about 0.8 cc/g.

EXAMPLE II

This example illustrates the experimental setup for investigating the demetallization of heavy oils by employing various nickel catalysts. A stainless steel trickle bed reactor, 28.5 inches long and 0.75 inches in diameter, fitted inside with a 0.25 O.D. axial thermocouple well, was filled with a top layer (3.5 inches below the feed inlet) of about 50 cc of low surface area (less than 1 m$^2$/gram) α-alumina, a middle layer of 50 cc of a nickel catalyst, and a bottom layer of about 50 cc of α-alumina. The reactor tube was heated by a Thermcraft (Winston-Salem, N.C.) Model 211 3-zone furnace. The reactor temperature was usually measured in four locations along the reactor bed by a travelling thermocouple that was moved within the axial thermocouple well.

First the reactor was heated to about 400°–425° C. in a stream of hydrogen having a flow rate of about 23–26 liter/hr, at a total pressure of about 1000 psig. During this phase Ni$_3$(AsO$_4$)$_2$ contained in Catalyst A was reduced to NiAs$_x$. Then oil was pumped by means of a LAPP Model 211 (General Electric Company) pump to a metallic mixing T-pipe where it was mixed with a controlled amount of hydrogen gas. The oil/hydrogen mixture was pumped downward through a stainless steel trickle bed reactor. The liquid product was collected in a receiver flask, filtered through a glass frit and analyzed, whereas exiting hydrogen gas was vented. Vanadium and nickel contents in oil were determined by plasma emission analysis.

The feed was a mixture of 26 weight-% toluene and 74 weight-% Venezuelan Monagas pipeline oil having an API gravity of about 17–18. The hydrogen pressure was maintained at about 1000 psig in all experiments which generally lasted from about 2–6 hours. The reactor temperature (average of thermocouple readings at four reactor locations) was about 375°–435° C. The liquid hourly space velocity (LHSV) of the feed ranged from about 0.5 cc/cc catalyst/hour to about 2 cc/cc catalyst/hour.

EXAMPLE III

Results of heavy oil demetallization runs at 425° C. and 400° C. in accordance with the procedure described in Example II are summarized in Table I.

TABLE I

| Run | Catalyst | Temp (°C.) | LHSV (cc/cc/hr) | Run Time (hours) | Feed Vanadium (ppm) | Feed Nickel (ppm) | Feed Total (V + Ni) (ppm) | Product Vanadium (ppm) | Product Nickel (ppm) | Product Total (V + Ni) (ppm) | Removal of (V + Ni) (%) |
|---|---|---|---|---|---|---|---|---|---|---|---|
| 1 | $NiAs_x$—$Al_2O_3$ | 425 | 0.45 | 6 | 225 | 58 | 283 | 0.2 | 0 | 0.2 | 100 |
| 2 | NiO—$Al_2O_3$ | 425 | 0.44 | 6 | 220 | 65 | 285 | 4.2 | 4.9 | 9.1 | 97 |
| 3 | $NiAs_x$—$Al_2O_3$ | 425 | 1.00 | 3 | 225 | 58 | 283 | 12.5 | 7.5 | 20.0 | 93 |
| 4 | NiO—$Al_2O_3$ | 425 | 0.96 | 4 | 220 | 65 | 285 | 34.9 | 21.8 | 56.2 | 80 |
| 5 | Harshaw[1] | 425 | 1.00 | 3 | 225 | 58 | 283 | 80.6 | 25.3 | 105.9 | 63 |
| 6 | $NiAs_x$—$Al_2O_3$ | 425 | 1.50 | 2 | 225 | 58 | 283 | 25.1 | 8.9 | 34.0 | 88 |
| 7 | NiO—$Al_2O_3$ | 425 | 1.46 | 3 | 220 | 65 | 285 | 62.9 | 26.3 | 89.2 | 69 |
| 8 | Harshaw | 425 | 1.51 | 3 | 225 | 58 | 283 | 95.8 | 29.3 | 125.1 | 56 |
| 9 | $NiAs_x$—$Al_2O_3$ | 400 | 0.47 | 6 | 225 | 58 | 283 | 45.0 | 17.6 | 62.6 | 78 |
| 10 | NiO—$Al_2O_3$ | 400 | 0.42 | 7 | 220 | 65 | 285 | 83.5 | 29.8 | 113.3 | 60 |
| 11 | Harshaw | 400 | 0.48 | 6 | 225 | 58 | 283 | 88.4 | 27.0 | 115.4 | 59 |
| 12 | $NiAs_x$—$Al_2O_3$ | 400 | 0.97 | 3 | 225 | 58 | 283 | 131.0 | 33.5 | 164.5 | 42 |
| 13 | NiO—$Al_2O_3$ | 400 | 0.95 | 3 | 220 | 65 | 285 | 179.5 | 43.4 | 222.9 | 22 |
| 14 | Harshaw | 400 | 1.01 | 3 | 225 | 58 | 283 | 134.0 | 39.4 | 173.4 | 39 |
| 15 | $NiAs_x$—$Al_2O_3$ | 400 | 1.52 | 2 | 225 | 58 | 283 | 177.0 | 41.2 | 218.2 | 23 |
| 16 | NiO—$Al_2O_3$ | 400 | 1.45 | 2 | 220 | 65 | 285 | 250.9[2] | 52.6 | 303.5[2] | 0[2] |
| 17 | Harshaw | 400 | 1.53 | 2 | 225 | 58 | 283 | 164.0 | 43.8 | 207.8 | 27 |
| 18 | $NiAs_x$—$Al_2O_3$ | 375 | 0.45 | 6 | 225 | 58 | 283 | 148.0 | 36.2 | 184.2 | 35 |
| 19 | Harshaw | 375 | 0.45 | 6 | 220 | 65 | 285 | 126.0 | 35.2 | 161.2 | 43 |
| 20 | $NiAs_x$—$Al_2O_3$ | 375 | 0.95 | 3 | 225 | 58 | 283 | 199.0 | 43.6 | 242.6 | 14 |
| 21 | Harshaw | 375 | 0.98 | 3 | 220 | 65 | 285 | 169.0 | 44.4 | 213.4 | 25 |

[1] a commercial oil hydrofining catalyst, marketed by Harshaw Chemical Company, having a surface area of about 178 m$^2$/g, a MoO$_3$ content of about 7.3 weight %, a CoO content of about 0.92 weight %, a NiO content of about 0.53 weight %, and Al$_2$O$_3$ as the support;
[2] result appears to be erroneous.

Data in Table I show that the $NiAs_x$—$Al_2O_3$ catalyst (i.e., reduced $Ni_3(AsO_4)_2$ on $Al_2O_3$) is clearly superior in removing metals (V, Ni) at 425° C. versus an $Al_2O_3$-supported NiO catalyst and the commercial Harshaw hydrofining catalyst. At 400° C., $NiAs_x$—$Al_2O_3$ was more effective than (Ni)—$Al_2O_3$ and also more effective than the commercial Harshaw catalyst.

EXAMPLE IV

This example illustrates the effect of the addition of small amounts of a decomposable molybdenum compound, $Mo(CO)_6$, to an undiluted Monagas pipeline oil feed containing about 336 ppm V and about 87 ppm Ni on the removal of these metals in the presence of the Harshaw control catalyst (see footnote 1 of Table I). LHSV of the feed for both runs ranged from about 1.0 to 1.1 cc/cc catalyst/hr, the temperature was about 765° F. (407° C.), the pressure was about 2250 psig, and the hydrogen feed rate was about 4800 SCF/barrel oil. Experimental data are summarized in Table II.

TABLE II

| Days on Stream | Run 22 (Control) PPM Mo in Feed | Run 22 (Control) % Removal of (Ni + V) | Run 23 (Control) PPM Mo in Feed | Run 23 (Control) % Removal of (Ni + V) |
|---|---|---|---|---|
| 5 | 0 | 64 | 17 | 72 |
| 12–13 | 0 | 62 | 17 | 71 |
| 17 | 0 | 59 | 7 | 70 |
| 20–21 | 0 | 61 | 7 | 65 |
| 26 | 0 | 58 | 7 | 64 |
| 32–33 | 0 | 53 | 7 | 65 |
| 41 | 0 | 52 | 7 | 70 |
| 52–53 | 0 | 41 | 7 | 66 |
| 58–59 | 0 | 43 | 4 | 65 |

Data in Table II clearly show the beneficial effect of added small amounts of Mo (as $Mo(CO)_6$) to the feed on the demetallization of the oil when a commercial hydrofining Harshaw catalyst was used. Based on these results, it is believed that a similarly beneficial demetallization effect of $Mo(CO)_6$ in the feed is also obtained when the catalyst of this invention, $NiAs_x$, is employed.

We claim:

1. A process for the demetallization of a hydrocarbon containing feed stream, which contains metals selected from the group consisting of vanadium and nickel, comprising the step of contacting said hydrocarbon containing feed stream under suitable demetallization conditions with hydrogen and a catalyst composition comprising (a) an alumina-containing support and (b) nickel arsenide, $NiAs_x$, wherein x ranges from about 0.33 to about 2.0, such as to produce a hydrocarbon containing stream having a reduced content of said metals.

2. A process in accordance with claim 1 wherein said catalyst composition is alumina-supported $NiAs_x$, wherein x ranges from about 0.6 to about 1.0.

3. A process in accordance with claim 1 wherein said catalyst composition is prepared by reduction of alumina-supported nickel arsenate with hydrogen gas.

4. A process in accordance with claim 3 comprising utilizing a catalyst wherein the nickel content ranges from about 1 to about 30 weight percent based on the weight of the finished catalyst composition, and the arsenic content ranges from about 0.5 to 50 weight percent based on the weight of the finished catalyst composition.

5. A process in accordance with claim 3 wherein the alumina-supported arsenate, before reduction with $H_2$, has a surface area (determined by BET/$N_2$) ranging from about 20 to about 300 m$^2$/g and a pore volume (determined by water absorption) of about 0.5 to about 1.5 cc/g.

6. A process in accordance with claim 5 wherein the nickel content ranges from about 10 to about 20 weight percent based on the weight of the finished catalyst composition, and the arsenic content ranges from about 10 to about 20 weight percent based on the weight of the finished catalyst composition.

7. A process in accordance with claim 1 wherein said suitable demetallization conditions comprise a reaction time between said catalyst composition and said hydrocarbon containing feed stream in the range of about 0.05 hours to about 10 hours, a temperature in the range of about 250° C. to about 550° C., a pressure in the range of up to about 5000 psig and a hydrogen flow rate in the range of about 100 to about 10,000 standard cubic feet per barrel of said hydrocarbon containing feed stream.

8. A process in accordance with claim 7 wherein said suitable demetallization conditions comprise a reaction time between said catalyst composition and said hydrocarbon containing feed stream in the range of about 0.4 hours to about 4 hours, a temperature in the range of 350° C. to about 450° C., a pressure in the range of about 100 to about 2500 psig and a hydrogen flow rate in the range of about 1000 to about 6000 standard cubic feet per barrel of said hydrocarbon containing feed stream.

9. A process in accordance with claim 7 wherein the hydrocarbon containing feed stream is selected from the group consisting of crude oils, petroleum products, coal pyrolyzates, coal extraction products, coal liquefaction products, products from tar sands, shale oil and products from shale oil.

10. A process in accordance with claim 9, wherein said hydrocarbon feed stream also contains sulfur and nitrogen impurities and coke precursors.

11. A process in accordance with claim 1 wherein at least one decomposable metal compound is introduced into said hydrocarbon containing feed stream prior to the contacting of said hydrocarbon containing feed stream with said catalyst composition, wherein the metal, chemically bound in said decomposable metal compound, is selected from the group consisting of the metals of Group IV-B, Group V-B, Group VI-B, Group VII-B and Group VIII of the Periodic Table.

12. A process in accordance with claim 11 wherein said decomposable metal compound is a carbonyl, acetate, acetylacetonate, octoate, naphthenate, dithiocarbamate, or dithiophosphate of said metal or metals.

13. A process in accordance with claim 12 wherein the metal in said decomposable metal compound is molybdenum.

14. A process in accordance with claim 13 wherein said decomposable metal compound is molybdenum hexacarbonyl.

15. A process in accordance with claim 11 wherein a sufficient quantity of said decomposable metal compound is added to said hydrocarbon containing feed stream to result in a concentration of the metal, chemically bound in said decomposable metal compound, ranging from about 1 to about 1000 ppm metal in said hydrocarbon containing feed stream.

16. A process in accordance with claim 15 wherein a sufficient quantity of said decomposable metal compound is added to said hydrocarbon containing feed stream to result in a concentration of the metal, chemically bound in said decomposable metal compound, ranging about 5 to about 100 ppm metal in said hydrocarbon containing feed stream.

17. A process in accordance with claim 1 wherein said catalyst composition is first impregnated with at least one decomposable compound of a metal selected from the group consisting of metals of Group IVB, VB, VIB, VIIB and VIII of the Periodic Table, and the hydrocarbon containing feed stream is then contacted under suitable demetallizing conditions with hydrogen and the thus impregnated catalyst composition so as to produce a hydrocarbon containing steam having reduced content of metals selected from the group consisting of vanadium and nickel.

18. A process in accordance with claim 17 wherein said decomposable compound is selected from the Group consisting of carbonyl, acetate, actylacetonate, octoate, naphthenate, dithiocarbamate and dithiophosphate.

19. A process in accordance with claim 18 wherein the metal in said decomposable compound is molybdenum.

20. A process in accordance with claim 17 wherein said catalyst composition is impregnated at a temperature sufficiently high so as to at least partially decompose said decomposable metal compound.

21. A process in accordance with claim 20 wherein said decomposable compound is selected from the Group consisting of carbonyl, acetate, actylacetonate, octoate, naphthenate, dithiocarbamate and dithiophosphate.

22. A process in accordance with claim 21 wherein the metal is molybdenum.

23. A process in accordance with claim 1 comprising the additional step of treating at least a portion of the hydrocarbon containing stream, having a reduced content of metals selected from the group consisting of vanadium and nickel, under catalytic cracking conditions so as to produce gasoline and other useful fuels.

24. A process in accordance with claim 17 comprising the additional step of treating at least a portion of the hydrocarbon containing stream, having a reduced content of metals selected from the group consisting of vanadium and nickel, under catalytic cracking conditions so as to produce gasoline and other useful fuels.

25. A process for demetallizing a heavy hydrocarbon containing feed stream, which contains about 10–1000 ppm of vanadium and about 5–500 ppm of nickel, comprising the step of contacting said feed stream with hydrogen and a catalyst composition comprising (a) an alumina-containing support and (b) nickel arsenide, $NiAs_x$, wherein x ranges from about 0.33 to about 2.0, under such conditions as to produce a hydrocarbon containing stream having a reduced content of vanadium and nickel.

26. A process in accordance with claim 25, wherein said heavy hydrocarbon containing feed stream comprises at least one of gas oil, topped crude and residuum.

* * * * *